US012577097B2

(12) United States Patent
Abraham et al.

(10) Patent No.: US 12,577,097 B2
(45) **Date of Patent: *Mar. 17, 2026**

(54) SODA CARBONATION AND DISPENSATION SYSTEM AND METHOD

(71) Applicants: Hunter Abraham, Slidell, LA (US); Martin J. Abraham, III, Slidell, LA (US)

(72) Inventors: Hunter Abraham, Slidell, LA (US); Martin J. Abraham, III, Slidell, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/507,947

(22) Filed: Nov. 13, 2023

(65) Prior Publication Data

US 2024/0083735 A1 Mar. 14, 2024

Related U.S. Application Data

(63) Continuation of application No. 17/033,069, filed on Sep. 25, 2020, now Pat. No. 11,897,749.

(Continued)

(51) Int. Cl.
*B67D 1/00* (2006.01)
*B01F 23/236* (2022.01)

(Continued)

(52) U.S. Cl.
CPC ........ *B67D 1/0857* (2013.01); *B01F 23/2362* (2022.01); *B67D 1/0027* (2013.01);

(Continued)

(58) Field of Classification Search
CPC ...... B67D 7/80; B67D 3/0009; B67D 1/0857; B67D 1/0061; B67D 1/0027;

(Continued)

(56) References Cited

U.S. PATENT DOCUMENTS

| | | | | |
|---|---|---|---|---|
| 4,928,853 A * | 5/1990 | Isham | B67D 1/0892 | D7/307 |
| 5,314,091 A * | 5/1994 | Credle, Jr. | B67D 1/0021 | 312/201 |
| 6,394,312 B1 * | 5/2002 | Endou | B67D 1/0032 | 222/63 |
| 6,685,054 B2 * | 2/2004 | Kameyama | B67D 1/0072 | 417/44.1 |
| 6,761,036 B2 * | 7/2004 | Teague | A23G 9/28 | 62/70 |

(Continued)

*Primary Examiner* — Frederick C Nicolas
(74) *Attorney, Agent, or Firm* — Sughrue Mion, PLLC

(57) ABSTRACT

A soda carbonation and dispensation system and method are provided. The system includes a carbonated water pump and motor assembly operable to draw fresh water into carbonator tanks and circulate the water through a chiller system. A carbon dioxide source is connected to the carbonator tanks to produce carbonated water. The system also includes a water level sensor connected to a controller, a plurality of syrup containers, a syrup pump, syrup regulator valves, a brix capacitor, a dispensing tower and faucets connected to the dispensing tower housing. The controller operates the water pump and motor assembly to maintain a water level within a predetermined range and to maintain continuous flow and refrigeration of the carbonated water, which optimizes carbonation. The brix capacitor receives chilled carbonated water and chilled syrup in separate lines. Carbonated water is circulated to the faucets through a manifold in the brix capacitor and then circulated back into the carbonator tanks. Valves are provided in the brix capacitor to manipulate carbonated water and syrup flow rates and pressures into the faucets. The system maintains the carbonated water and syrup at a refrigerated temperature and a predetermined maximum pressure. When a faucet is opened, the carbonated water and syrup mix as they flow laminarly into a container. The result is consistently optimum carbonation when the beverage is dispensed.

20 Claims, 13 Drawing Sheets

Related U.S. Application Data

(60) Provisional application No. 62/906,065, filed on Sep. 25, 2019.

(51) Int. Cl.
*B67D 1/08* (2006.01)
*B67D 1/14* (2006.01)

(52) U.S. Cl.
CPC ......... *B67D 1/0031* (2013.01); *B67D 1/0061* (2013.01); *B67D 1/0862* (2013.01); *B67D 1/1422* (2013.01); *B67D 1/1472* (2013.01); *B67D 2210/0006* (2013.01); *B67D 2210/00139* (2013.01)

(58) Field of Classification Search
CPC ................ B67D 1/0031; B67D 1/1422; B67D 1/1472; B67D 2210/0006; B67D 2210/00139; B67D 1/0862; B65D 83/72; B65D 88/74; B05C 5/001; B05C 11/1042; B01F 23/2362
See application file for complete search history.

(56) References Cited

U.S. PATENT DOCUMENTS

| | | | | | |
|---|---|---|---|---|---|
| 7,305,847 | B2 * | 12/2007 | Wolski | B67D 1/0888 | 62/390 |
| 7,389,647 | B1 * | 6/2008 | Abraham, III | B67D 1/0884 | 62/434 |
| 9,062,902 | B2 * | 6/2015 | Billman | F25C 5/10 | |
| 2002/0060226 | A1 * | 5/2002 | Kameyama | B67D 1/1218 | 418/206.5 |
| 2005/0011910 | A1 * | 1/2005 | McCann | B67D 1/0861 | 222/146.6 |
| 2006/0021372 | A1 * | 2/2006 | Wolski | F25D 15/00 | 62/389 |
| 2011/0041543 | A1 * | 2/2011 | Tachibana | B67D 1/0057 | 62/340 |
| 2011/0042414 | A1 * | 2/2011 | Tachibana | B67D 1/0864 | 222/129.1 |
| 2011/0220681 | A1 * | 9/2011 | Paul | B67D 1/10 | 222/1 |
| 2014/0263406 | A1 * | 9/2014 | Green | B67D 1/0065 | 62/332 |
| 2015/0166319 | A1 * | 6/2015 | Kaneko | B67D 1/005 | 222/145.2 |
| 2021/0139307 | A1 * | 5/2021 | Abraham, III | B67D 1/12 | |

* cited by examiner

SODA CARBONATION AND DISPENSATION SYSTEM AND METHOD

CROSS REFERENCE TO RELATED APPLICATIONS

This application is a Continuation application of U.S. application Ser. No. 17/033,069, filed Sep. 25, 2020, which claims priority to U.S. Provisional Patent Application No. 62/906,065, filed Sep. 25, 2019, the entirety of which are incorporated herein by reference.

BACKGROUND

The present invention relates to carbonated beverage dispensation systems, commonly called soda fountains, which prepare and dispense carbonated beverages on-demand. More specifically, the present invention is directed to a system and method for making carbonated water, conveying chilled, low pressure carbonated water and flavored syrup to a dispensing tower, and mixing the carbonated water and syrup as they are dispensed into a container.

Carbonated beverages are typically prepared when pressurized carbonated water and flavored syrup are held within separate tanks and then mixed as they are pumped through a single discharge spout or faucet. A user selects the beverage by pressing a button or activating a lever below a discharge spout, the corresponding flavored syrup is drawn from its reservoir and carbonated water is drawn from its reservoir, the fluids are mixed en route to the discharge spout, and the mixed beverage flows into the target container. A typical system mixes the carbonated water and syrup in a set ratio to distribute a mixed beverage of desired flavor and consistency. The ratio is adjusted depending on the beverage type and consumer preference.

Carbonation is a desirable characteristic of fountain beverages such as soda pop, cocktail mixers, beer and sparkling wines. The carbon dioxide bubbles convey an aromatic sensation as the beverage is lifted to the nose, which creates a heightened perception of flavor. Carbonation also creates an appealing texture or notion of freshness as the bubbles tingle one's mouth. It is well known that a carbonated beverage loses its appeal when carbonation is expelled and the beverage "goes flat".

With current beverage fountain systems, soda water loses carbonation because it becomes stagnant and it is not continuously chilled. High pressure and high temperature dispensation also cause excessive foaming when the beverage is dispensed, which causes rapid carbonation loss. Consequently, typical fountain beverages lose their appeal soon after they are dispensed.

Accordingly, there is a need for a soda carbonation and dispensation system and method that helps preserves carbonation in fountain beverages after they are dispensed. The purpose of this invention is to maintain a constant carbonation level within the system and eliminate excessive foaming as the beverage is dispensed.

U.S. Pat. No. 7,389,647 directed to refrigeration blocks is incorporated by reference, as are U.S. Pat. Nos. 8,347,646, 8,616,020, and 9,366,475, all directed to temperature-controlled beverage dispensation systems.

SUMMARY

The following embodiments thereof are described and illustrated in conjunction with systems, machines and methods which are meant to be exemplary and illustrative, and not limiting in scope. In various embodiments, one or more of the above-described problems have been reduced or eliminated, while other embodiments are directed to other improvements.

The present invention is directed to a soda carbonation and dispensation system and method that solves the problem of rapid carbonation loss of fountain beverages by maintaining constant carbonation through continuous circulation, achieving a constant low fluid temperature, and delivering the carbonated water and flavored syrup to the dispensing faucet at a low pressure to reduce foaming.

In accordance with embodiments of the invention, a soda carbonation and dispensation system is provided which is operable to infuse water with carbon dioxide to create first-stage carbonated water. A first pump and motor assembly is operable to draw uncarbonated water through a chiller and into a first carbonator tank. A pressurized carbon dioxide source is connected to the first carbonator tank.

A second carbonator tank is provided which includes a carbonation stone that facilitates creation of second-stage carbonated water. A second pump and motor assembly is operable to draw carbonated water from the first carbonator tank and the second carbonator tank, thereby mixing the first- and second-stage carbonated water. The second pump and motor assembly pumps the mixed carbonated water through a cold block and back into the first and second carbonator tanks. A third pump and motor assembly is provided which draws carbonated water from the second carbonator tank and injects it into a carbonated water delivery loop which is connected to a beverage dispensing tower.

An electrical controller is connected to the first and second pump and motor assemblies and the first carbonator tank, which detects the fluid level of the first carbonator tank and controls the operation of the first and second pump and motor assembly to maintain a set fluid level in the first carbonator tank. The electrical controller also circulates first- and second-stage carbonated water through a chiller system to create an optimal mixture of carbonated water and maintain it at a predetermined temperature.

A flavored syrup chilling and supply system is provided which includes a plurality of sealer bags or similar vessels which contain flavored syrup. A set of pump assemblies are operable to pump the syrup into a chilled delivery line system connected to the beverage dispensing tower. A plurality of flow control regulators are operable to control the flow rate and pressure of the syrup as it is pumped through the delivery line system.

A brix capacitor is connected to the carbonated water delivery loop and the syrup chilling and supply system. The brix capacitor is operable regulate the flow of carbonated water and syrup to the faucets in the dispensing tower such that syrup is delivered to each faucet at a lower pressure than the pressure of the carbonated water. The brix capacitor also provides for a carbonated water return to the suction side of the third pump and motor assembly.

Carbonated water is continuously circulated through the carbonated water delivery loop to maintain a constant low temperature and consistent carbonation level. The syrup and carbonated water are mixed to create a carbonated beverage when the faucets are opened. The pressures of the syrup and carbonated water are kept low to facilitate laminar flow of the beverage into the target container.

DETAILED DESCRIPTION

For a further understanding of the nature and function of the embodiments, reference should be made to the following detailed description. It will be readily appreciated that the embodiments are well adapted to carry out and obtain the ends and features mentioned as well as those inherent herein. It is to be understood, however, that the present invention is embodied in various forms. Therefore, persons of ordinary skill in the art will realize that the following disclosure is illustrative only and not in any way limiting, as the specific details disclosed herein provide a basis for the claims and a representative basis for teaching to employ the present invention in virtually any appropriately detailed system, structure or manner. It should be understood that the devices, materials, methods, procedures, and techniques described herein are presently representative of various embodiments. Other embodiments of the disclosure will readily suggest themselves to such skilled persons having the benefit of this disclosure.

In accordance with embodiments of the invention, a soda carbonation and dispensation system is provided. In an embodiment, the system comprises subsystems including a water carbonation and circulation system, a flavored syrup delivery system, and a beverage dispensation system.

Figure 1:
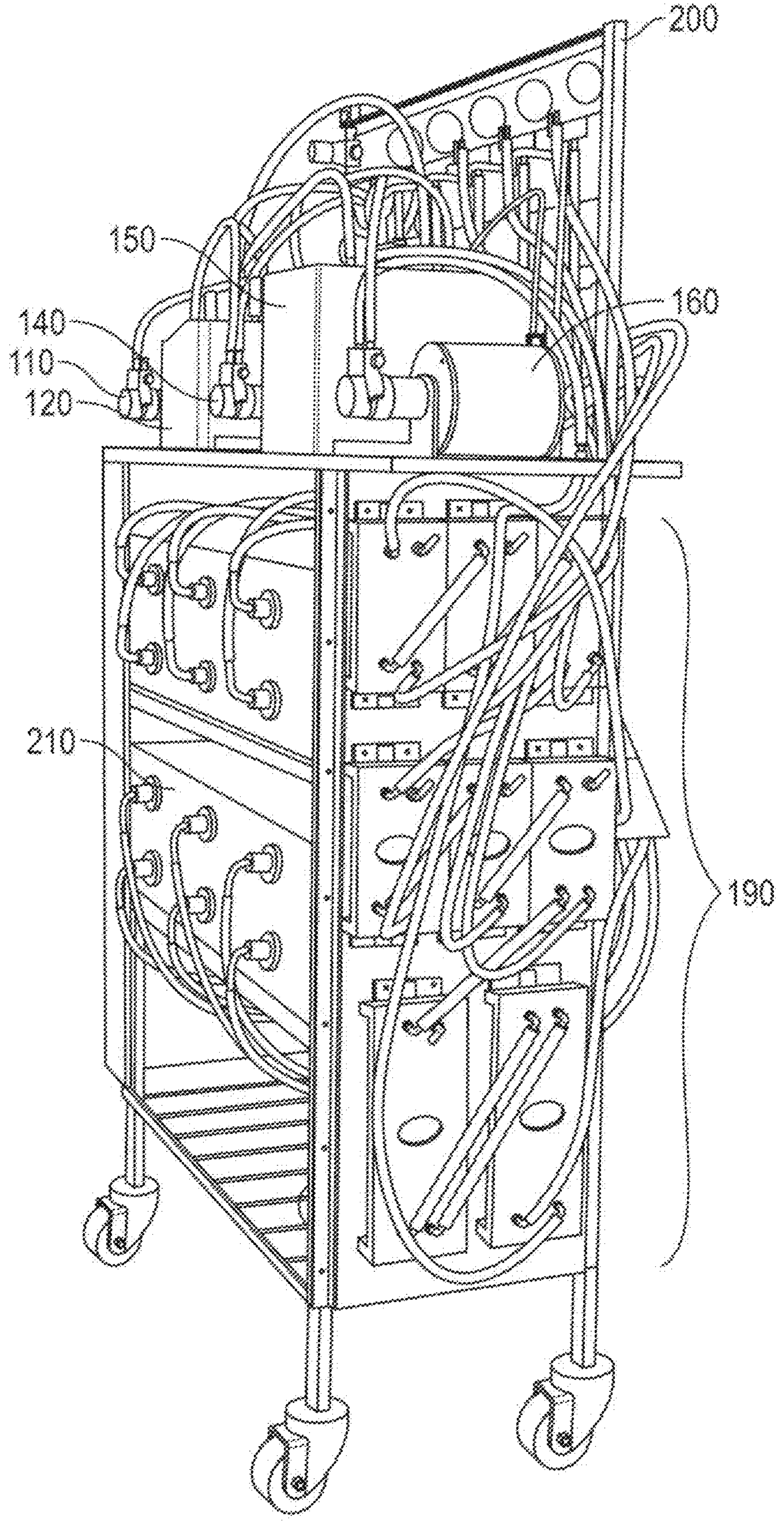
FIG. 1 is a perspective view of a complete soda rack in accordance with embodiments of the invention.
Figure 2:
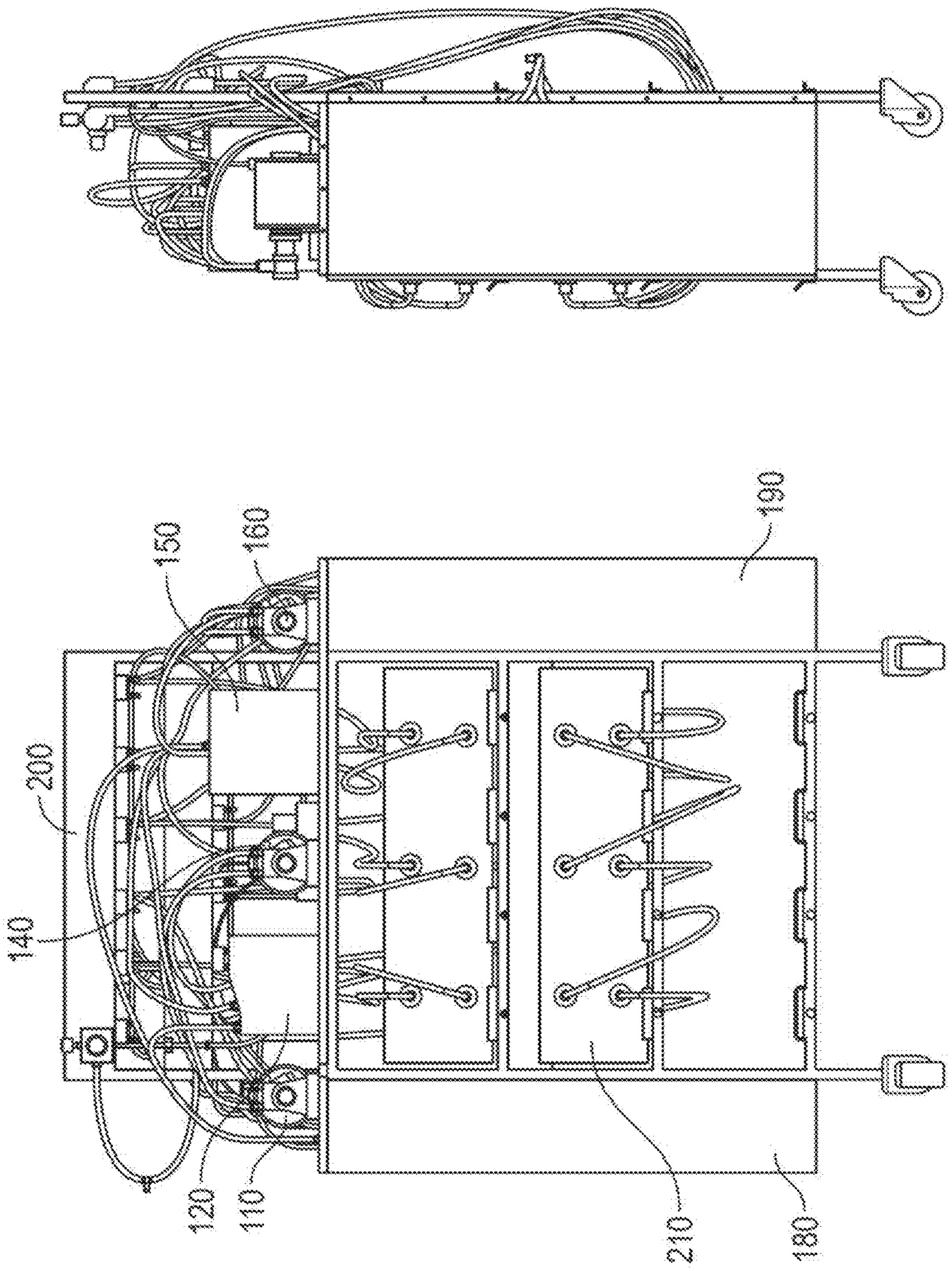
FIG. 2 is a diagram of a complete soda rack in accordance with embodiments of the invention.

FIG. 1 shows an embodiment of a water carbonation and circulation system and a flavored syrup delivery system of the invention, including a carbonator pump and motor 110, a first carbonator tank 120, a circulating pump and motor 140, a second carbonator tank 150, a tower circulation pump and motor 160, a right chiller bank 190, syrup sources 210, a syrup pump 260, and syrup regulators 270, all housed upon a pump rack 200. FIG. 2 shows a diagram of a front view and a side view of pump rack 200 with the aforementioned components and the addition of left chiller bank 180. Left chiller bank 180 and right chiller bank 190 include a plurality of cold water blocks 220 and cold syrup blocks 230.

In an exemplary embodiment, carbonator pump and motor 110 and circulating pump and motor 140 are 100 gallon-per-hour pumps such as the Procon #103B100F31BB and ⅓ horsepower motors such as the Nidec #5-557297. In an exemplary embodiment, tower circulation pump and motor 160 is a 35-50 gallon-per-hour stainless steel pump such as the Procon #103B35F31BB and a ⅓ horsepower motor such as the Nidec #5-557297. In an exemplary embodiment, cold water blocks 220 and cold syrup blocks 230 are of the type disclosed in U.S. Pat. No. 7,389,647 issued to Martin J. Abraham, III on Jun. 24, 2008 (U.S. Pat. No. 7,389,647 is incorporated herein by reference as if set forth in full below). Cold water blocks 220 are the same or similar in type as HTG MFG-HTGN023A-10. Cold syrup blocks 230 are the same or similar in type as HTG MFG-HTGN012A-08-1032. In an exemplary embodiment, syrup pumps 260 are pneumatic bag-in-box pumps such as the Xylem Flojet T5000-515 and are operable to discharge syrup from 20 pounds per square inch to 90 pounds per square inch. In an exemplary embodiment, syrup regulators 270 are the same or similar type as Tap Rite T5261SN.

First carbonator tank 120 may include a pressure relief valve 250, and an internal sensor and flotation device 280 which is electrically connected to controller 130. Internal sensor and flotation device 280 may measure the water level in first carbonator tank 120 and send an electrical signal to controller 130 when the water level reaches a predetermined high level and falls below a predetermined low level. A spray nozzle is inserted into the bottom of first carbonator tank 120 to connect a pressurized carbon dioxide source to infuse water with carbon dioxide at a pressure of approximately fifty pounds per square inch. In an exemplary embodiment, first carbonator tank 120 is the same or similar in type as Manitowoc carbonation tank #E400397, and internal sensor and flotation device 280 is the same or similar in type as Manitowoc float #16-21-15.

In an embodiment, second carbonator tank 150 may include a pressure relief valve 250 and a carbonation stone 290. In an exemplary embodiment, pressure relief valve 250 is a check valve such as the John Guest JG3/8SCV or the Valve Check C103-5-1M-100. In an alternative embodiment. Valve Check C103-5-1M-60 is used. In an exemplary embodiment, carbonation stone 290 is the same or similar in type as Glacier Tanks CBST-R150-006. In an exemplary embodiment, second carbonator tank 150 is the same or similar type as Sharpsville D0077693-C, and has a volume that exceeds the volume of first carbonator tank by approximately one-half gallon.

Figure 3:
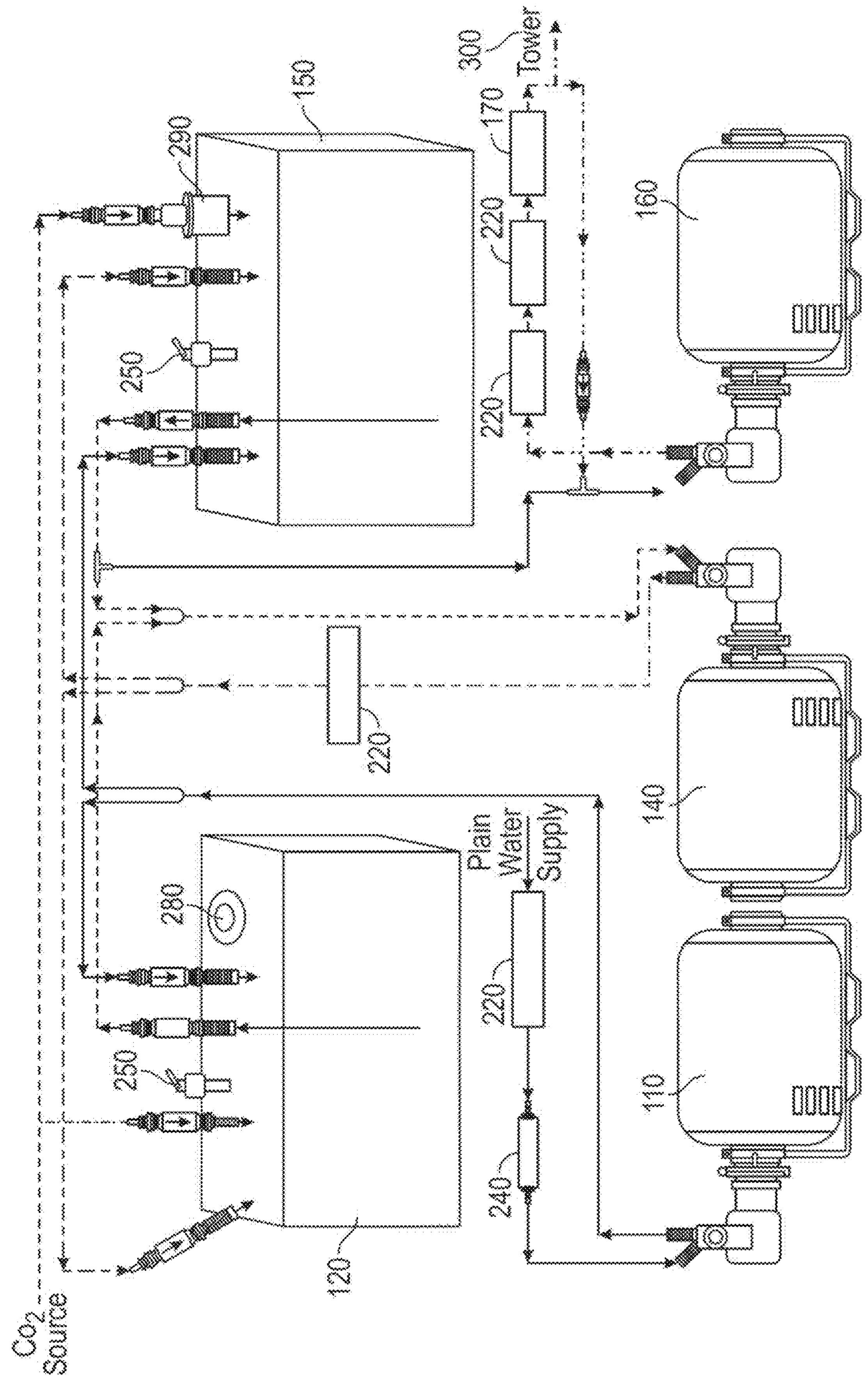
FIG. 3 is a diagram of a carbonated water circulation system in accordance with embodiments of the invention.

As depicted in the flow diagram of FIG. 3, the suction of carbonator pump and motor 110 is connected to an uncarbonated source of fresh water and operable to draw water through at least one cold water block 220 and a water pressure regulator 240. The discharge of carbonator pump and motor 110 is connected to first carbonator tank 120.

First carbonator tank 120 is also connected to the suction of circulating pump and motor 140 so that carbonated water is drawn from first carbonator tank 120 and pumped into second carbonator tank 150. First carbonator tank 120 is also connected to cold water blocks 220 so that it may receive refrigerated water from cold water blocks 220.

Controller 130 is an electrical circuit which is engineered to activate and deactivate carbonator pump and motor 110 and circulating pump and motor 140 depending on the water level in first carbonator tank 120 as further described herein. An electrical diagram of controller 130 is provided in FIG. 6.

Figure 4:
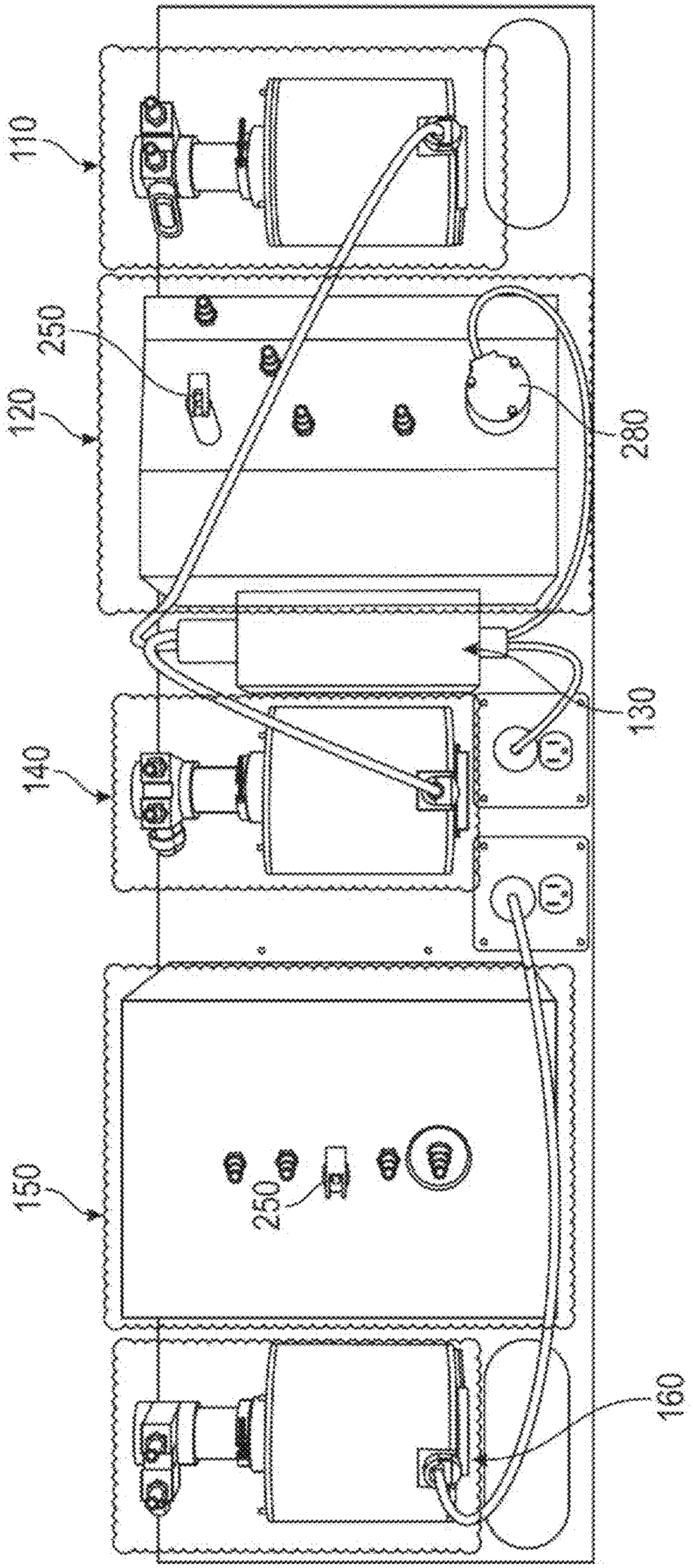
FIG. 4 is an overhead view of an arrangement of carbonated water pump and motor assemblies and carbonator tanks in accordance with embodiments of the invention.
Figure 5:
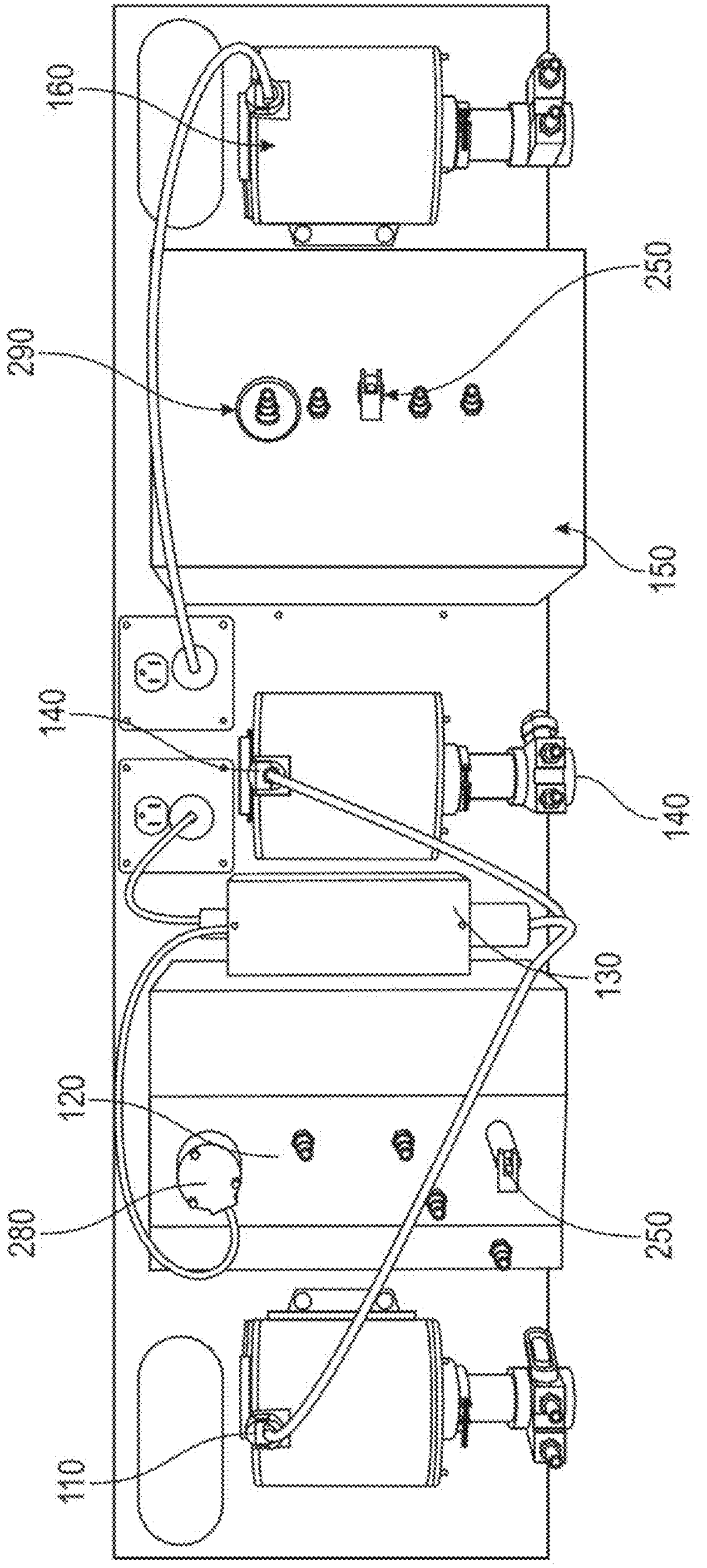
FIG. 5 is an overhead view of an arrangement of carbonated water pump and motor assemblies and carbonator tanks with subcomponents labeled in accordance with embodiments of the invention.

An exemplary arrangement of carbonator pump and motor 110, first carbonator tank 120, controller 130, circulating pump and motor 140, second carbonator tank 150 and tower circulation pump and motor 160 is shown in FIGS. 4 and 5. In one embodiment, second carbonator tank 150 is connected to the discharge of carbonator pump and motor 110 so it may receive uncarbonated fresh water. Second carbonator tank 150 is also connected to the suction and discharge of circulating pump and motor 140 so that circulating pump and motor 140 may circulate carbonated water from second carbonator tank 150, through cold water blocks 220, and back into second carbonator tank 150. Second carbonator tank 150 is also connected to tower circulation pump and motor 160 so that carbonated water is pumped to brix capacitor 170 and beverage dispensing tower 300.

In an exemplary embodiment, controller 130 is operable to activate carbonator pump and motor 110 and circulating pump and motor 140, and allow them to operate until first carbonator tank 120 reaches a predetermined high level, at which time controller 130 deactivates carbonator pump and motor 110 to stop adding water to the system. Controller 130 may continue to run circulating pump and motor 140 to make carbonated water.

In an embodiment, carbonation stone 290 within second carbonator tank 150 is connected to a pressurized carbon dioxide source to infuse carbonated water within second carbonator tank 150 with carbon dioxide at a pressure of approximately fifty pounds per square inch. In an exemplary embodiment, carbon dioxide diffuses through carbonation stone 290 into the water creating very small carbon dioxide bubbles which dissolve into the water. The carbonation level of the carbonated water is adjustable by altering the run-time of circulating pump and motor 140.

As shown in FIG. 3, the suction of tower circulation pump and motor 160 is connected to second carbonator tank 150, and the discharge of tower circulation pump and motor 160 is connected to brix capacitor 170 such that during operation, tower circulation pump and motor 160 sucks carbonated water from second carbonator tank 150 and pumps it through cold water blocks 220 and into manifold 171 of brix capacitor 170, where it is distributed to individual faucets 310 within beverage dispensing tower 300 and circulated back to tower circulation pump and motor 160 to achieve continuous, chilled circulation.

Figure 7:
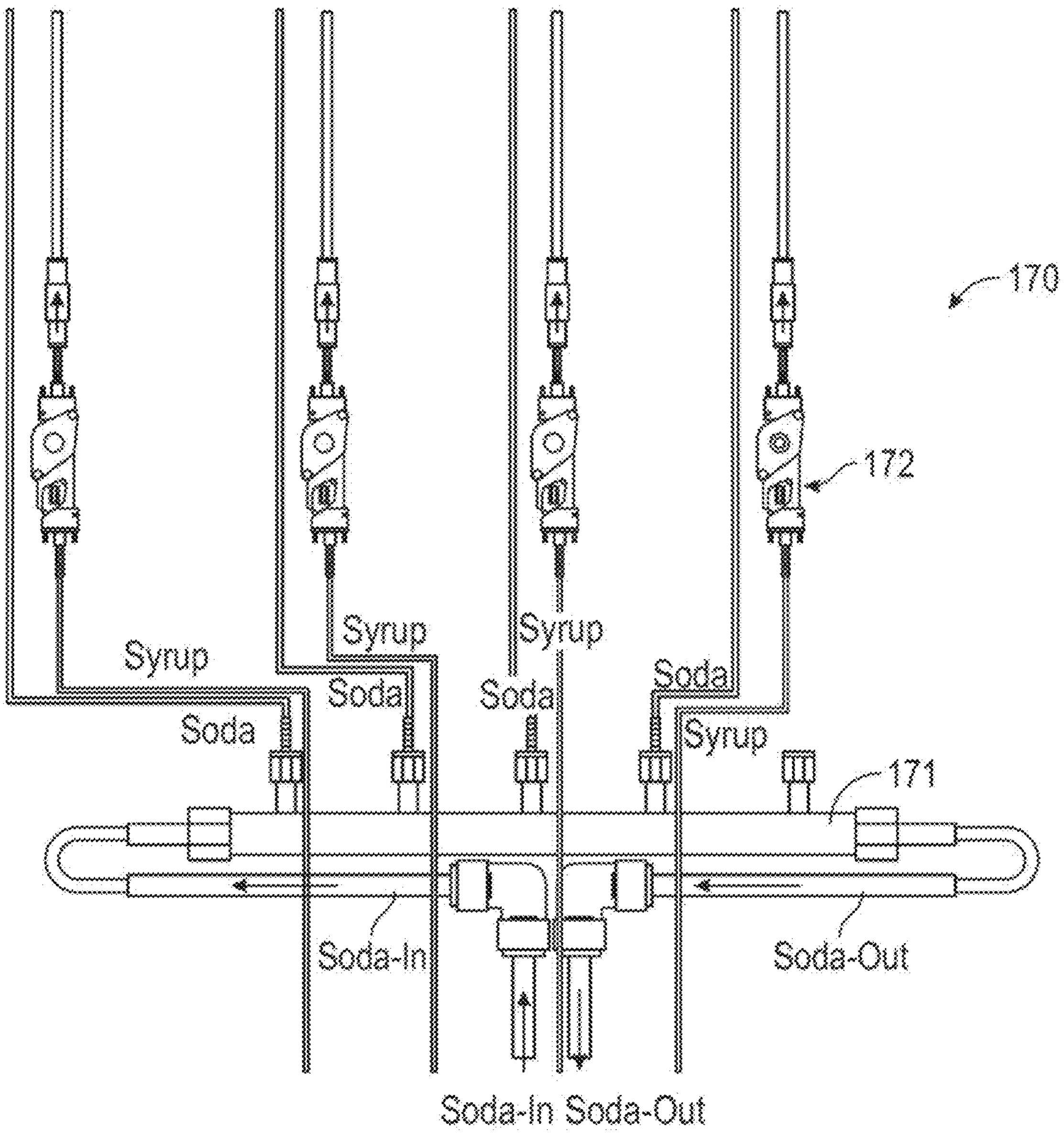
FIG. 7 is a diagram of the brix capacitor in accordance with embodiments of the invention.
Figure 8:
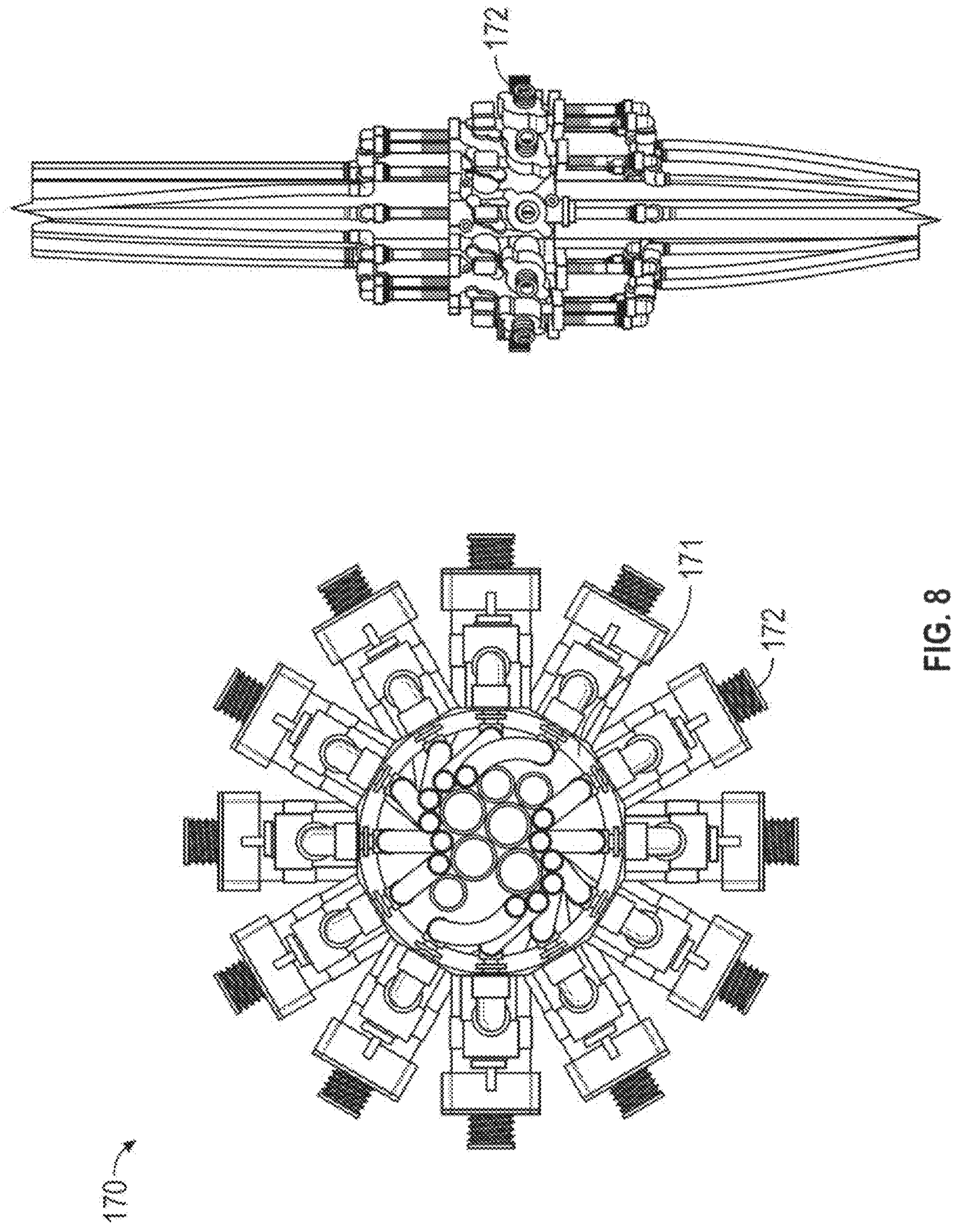
FIG. 8 is a perspective view and a top cross-sectional view of the brix capacitor in accordance with embodiments of the invention.
Figure 9:
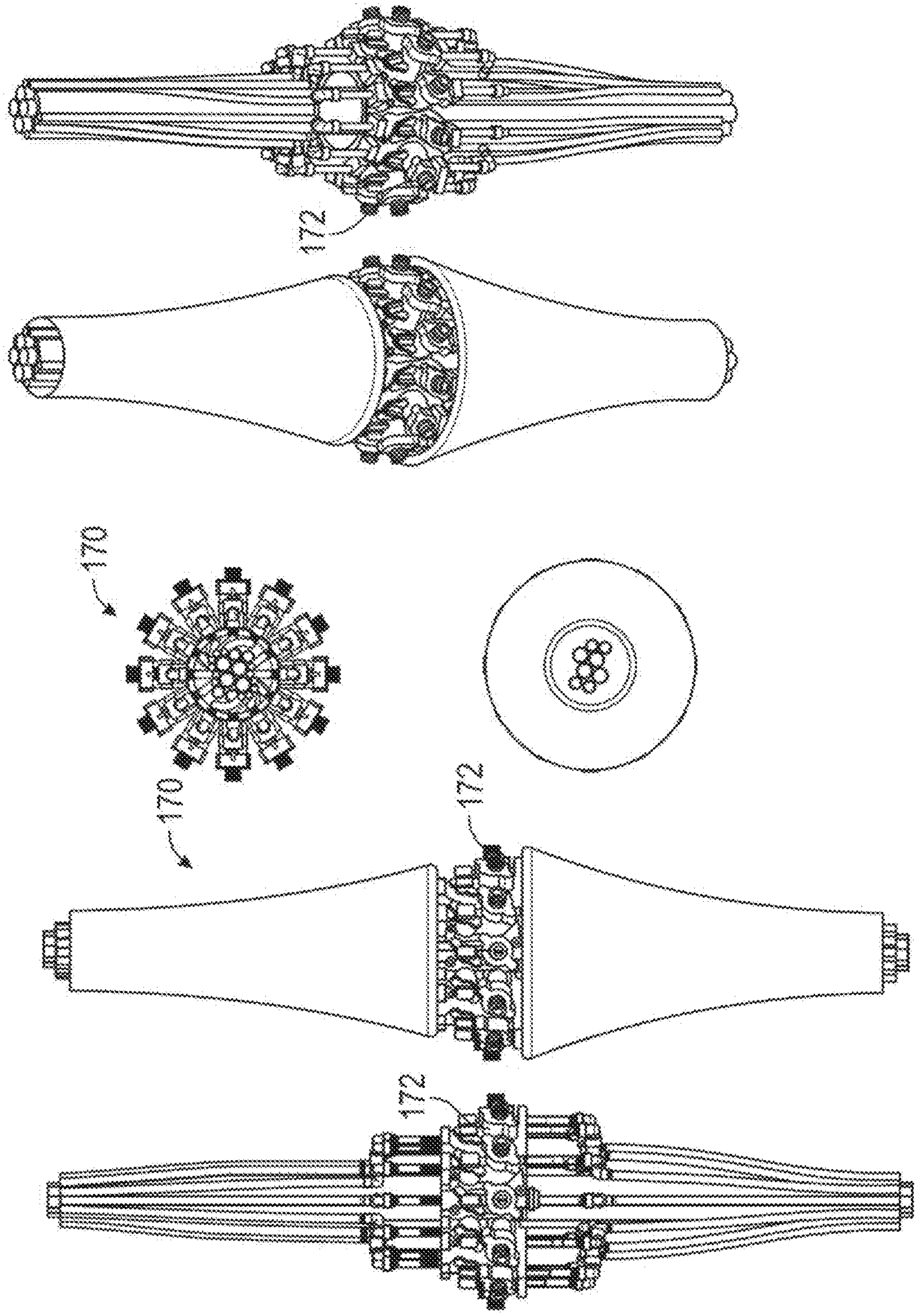
FIG. 9 is a multi-perspective view of the brix capacitor.

An exemplary flow diagram of brix capacitor 170 is shown in FIG. 7. Exemplary embodiments of brix capacitor 170 are shown in FIGS. 8 and 9. In an embodiment, brix capacitor 170 houses manifold 171 which receives chilled water pumped from tower circulation pump and motor 160 and through cold water blocks 220. In one embodiment, manifold 171 is circular and provides a mounting structure for flow control valves 172. In an exemplary embodiment, flow control valves 172 are the same or of a similar type as Schroder America #639-0034 or Schroder America #639-0050.

A plurality of discharge nozzles is displaced on manifold 171, each providing an independent carbonated water supply line to each faucet 310. In an exemplary embodiment, a carbonated water supply line between brix capacitor 170 and each faucet 310 is approximately 72 inches in length, with an inner diameter of 0.117 inches and an outer diameter of 0.1875 inches.

As shown in FIG. 7, manifold 171 within brix capacitor 170 may also discharge carbonated water into a return line whereby it may flow back into the suction line of tower circulation pump and motor 160, which then recirculates the carbonated water through cold water blocks 220 and manifold 171 of brix capacitor 170. Such recirculation helps maintain a consistent and desirable carbonation level in three ways. First, the recirculated carbonated water is mixed with freshly carbonated water on the suction side of tower circulation pump and motor 160. Second, the recirculated carbonated water is continuously refrigerated as it is pumped through cold water blocks 220. Low temperature fluctuation promotes a stable carbonation level. Third, the recirculated carbonated water does not stagnate, which eliminates a typical cause of carbonation loss.

As shown in FIGS. 1 and 2, a flavored syrup circulation system comprises pump rack 200, syrup pumps 260, syrup regulators 270 and cold syrup blocks 230. In an embodiment, a plurality of syrup sources 210 containing a variety of flavored syrups are disposed on pump rack 200. In an exemplary embodiment, syrup sources 210 are sealer bags which are commonly known in the industry.

In an embodiment, each syrup source 210 is connected to a corresponding syrup pump 260 which is operable to pump syrup out of syrup source 210 and discharge the syrup to brix capacitor 170. Syrup regulators 270 are operable to control the flow rate and pressure of the syrup.

As depicted in FIG. 7, syrup flows into one of a plurality of flow control valves 172 disposed throughout brix capacitor 170. Syrup then flows from brix capacitor 170 into beverage dispensing tower 300 and to one of a plurality of faucets 310. Each flow control valve 172 is independently adjustable to manipulate the flow rate and pressure of the syrup.

Figure 10:
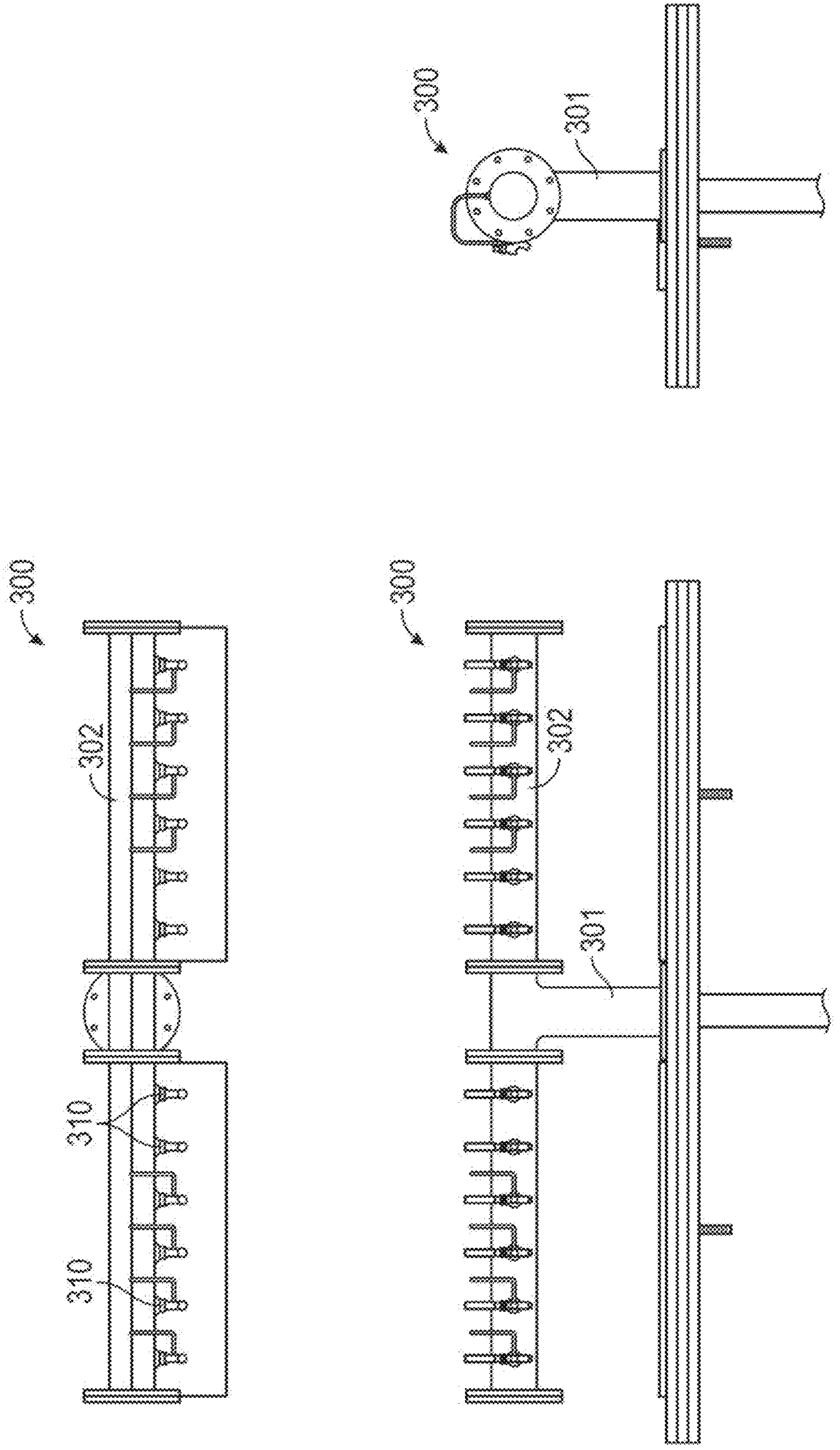
FIG. 10 is a diagram of the soda dispensing tower in accordance with embodiments of the invention.
Figure 11:
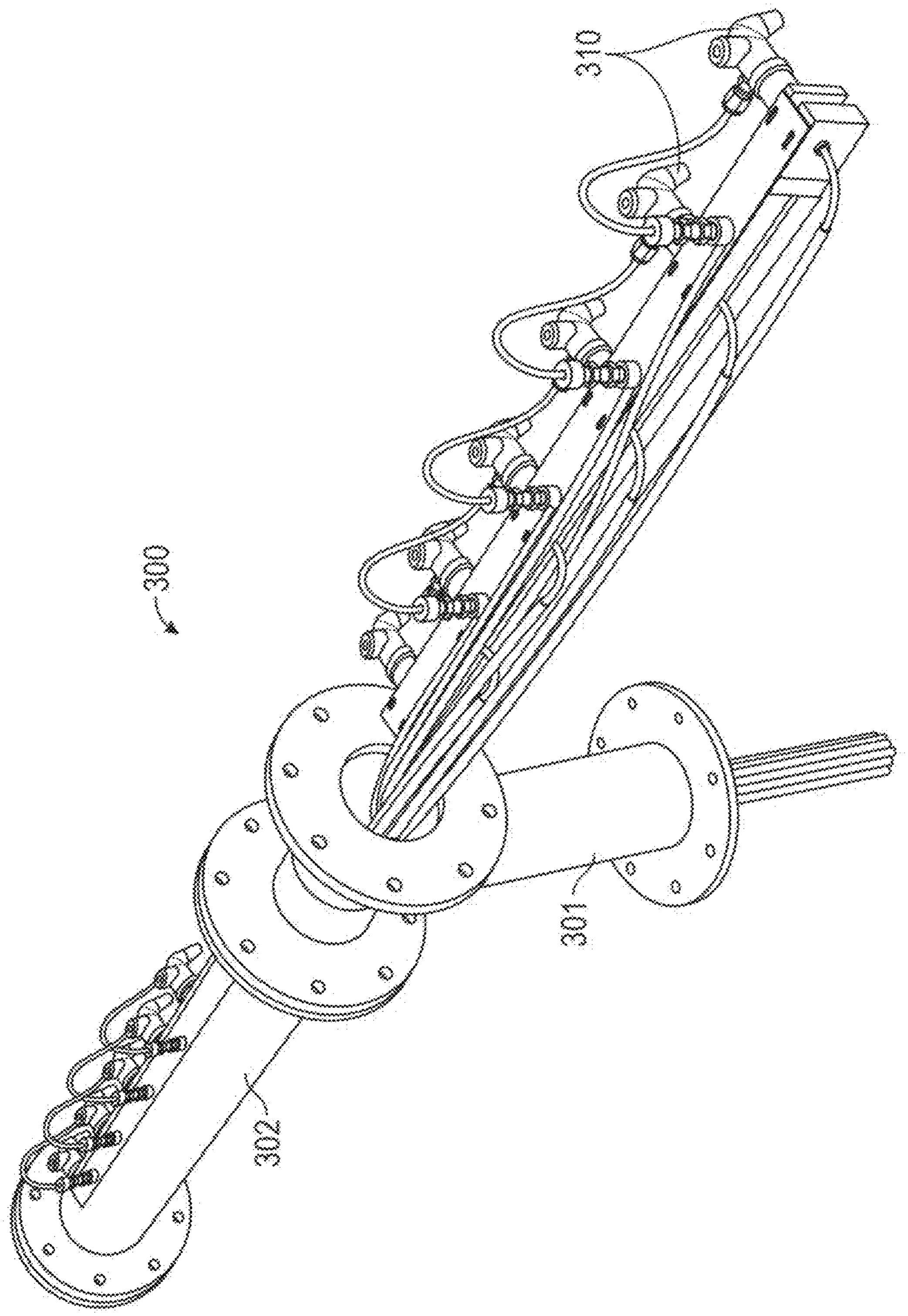
FIG. 11 is a perspective view of the soda dispensing tower in accordance with embodiments of the invention.

As shown in FIGS. 10 and 11, the beverage dispensation system comprises beverage dispensing tower 300 and a plurality of soda faucets 310. In an embodiment, beverage dispensing tower 300 comprises a vertical housing 301 which is perpendicularly connected to a lateral housing 302 which extends in equal, opposing axial directions to form a "tee". The soda delivery lines and syrup delivery lines are housed within vertical housing 301 and lateral housing 302 as they run from brix capacitor 170 to faucets 310, which are disposed along the lateral housing of beverage dispensing tower 300. As shown in FIG. 7, one soda delivery line and one syrup delivery line is each connected to a dedicated faucet 310.

In an exemplary embodiment, beverage dispensing tower 300 may incorporate a chilling system similar to or any combination of those described in U.S. Pat. Nos. 8,347,646, 8,616,020, and 9,366,475, issued to Martin J. Abraham, III on Jun. 14, 2016, all of which are incorporated herein by reference as if set forth in full below.

Figure 12:
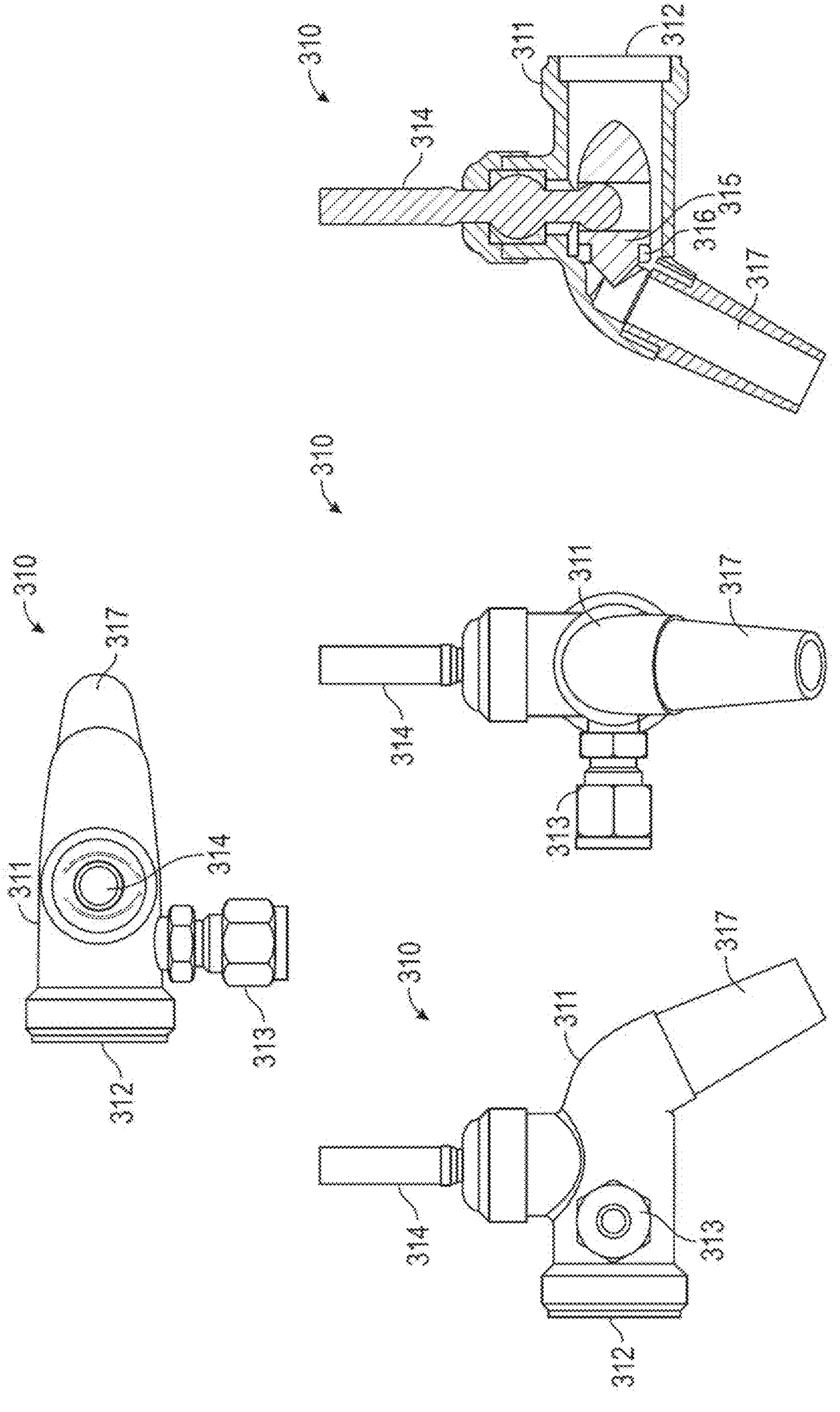
FIG. 12 is a multi-perspective view and cross section of a faucet in accordance with embodiments of the invention.
Figure 13:
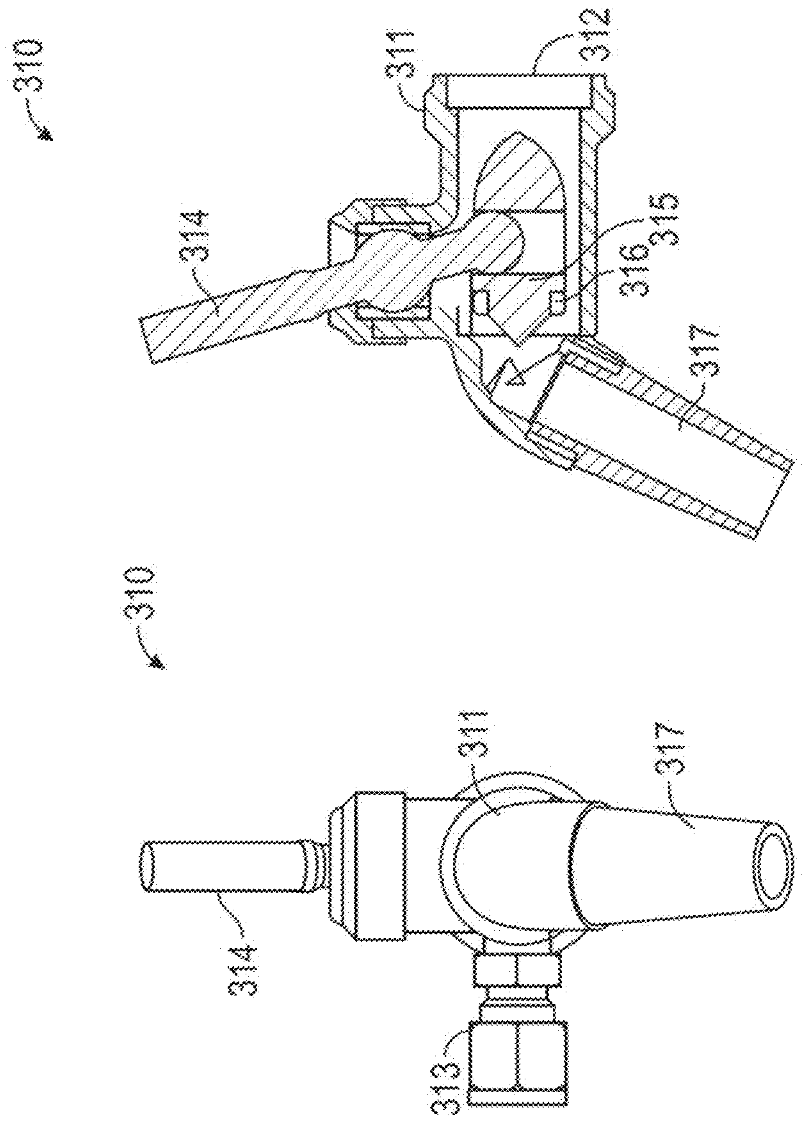
FIG. 13 is a front view and cross section of a faucet in the closed position in accordance with embodiments of the invention.

As shown in FIGS. 12 and 13, faucet 310 comprises outer housing 311, carbonated water injection port 312, syrup injection port 313, handle lever 314, internal plunger 315, seat 316 and conical flow guide 317. Soda is circulated into carbonated water injection port 312. Likewise, syrup is injected into syrup injection port 313. In an exemplary embodiment, faucet 310 is closed when handle lever 314 is rocked such that internal plunger 315 is pressed against seat 316 to create a seal. Faucet 310 is opened when handle lever 314 is rocked such that internal plunger 315 is unseated. Pressurized soda and syrup are mixed as they flow through conical flow guide 317 into a target container.

In an embodiment, syrup regulators 270 and tower circulation pump and motor 160 is set to maintain a carbonated water pressure approximately 10-15 pounds per square inch higher than the pressure of the syrup. Constant differential pressure helps prevent the fluids from mixing when faucet 310 is closed.

By way of example, the present invention operates when carbonator pump and motor 110 draws fresh water through cold water block 220 and pumps it into first carbonator tank 120. In an embodiment, carbon dioxide pressurized to a maximum of fifty pounds per square inch is infused into the water inside first carbonator tank 120 to create first-stage carbonated water. As shown in FIG. 3, circulating pump and motor 140 draws first-stage carbonated water from first carbonator tank 120 and pumps it back into first carbonator tank 120 and into second carbonator tank 150.

Pressurized carbon dioxide flows through carbonation stone 290 into the carbonated water inside second carbonator tank 150, creating second-stage carbonated water. Circulating pump and motor 140 draws second-stage carbonated water from second carbonator tank 150 and pumps it through cold water blocks 220 and back into first carbonator tank 120 and into second carbonator tank 150.

In an embodiment, controller 130 stops the operation of carbonator pump and motor 110 when the water level inside first carbonator tank 120 reaches a predetermined high level. At such time, second carbonator tank 150 may be unfilled by approximately one-half gallon given the volume difference between first carbonator tank 120 and second carbonator tank 150. Circulating pump and motor 140 continues to circulate carbonated water to increase the carbonation level of the water and facilitate a preferable mixture of first- and second-stage carbonated water. After approximately twenty minutes, controller 130 stops the operation of circulating pump and motor 140 because the carbonation level and quality may be ideal. It should be noted that the carbonation level and quality may be adjusted by changing the run time and operation time intervals of circulating pump and motor 140.

Tower circulation pump and motor 160, draws second-stage carbonated water from second carbonator tank 150 and pumps it through cold water blocks 220 and into manifold 171 within brix capacitor 170. Second-stage carbonated water flows from manifold 171 to faucets 310 within beverage dispensing tower 300, and it returns to the suction side of tower circulation pump and motor 160, thereby continuously circulating through cold water blocks 220, manifold 171, and faucets 310.

Figure 6:
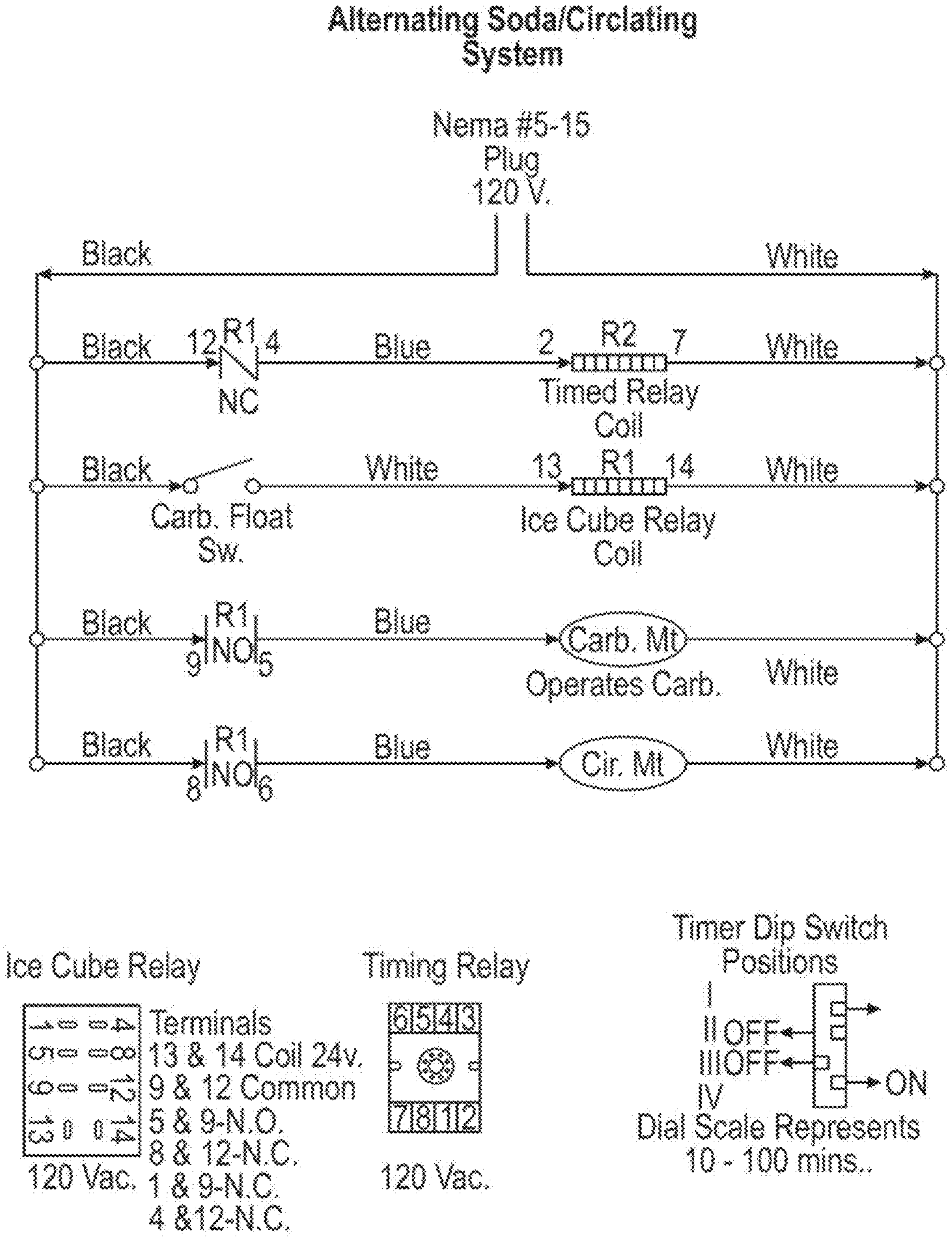
FIG. 6 is an electrical diagram of the controller in accordance with embodiments of the invention.

An electrical diagram of controlled operation of the water carbonation and circulation system is depicted in FIG. 6. Internal sensor and flotation device 280 monitors the water level in first carbonator tank 120. When the water level in first carbonator tank 120 falls to a predetermined low level, internal sensor and flotation device 280 sends an electrical signal to controller 130 which activates carbonator pump and motor 110 to pump additional fresh water into first carbonator tank 120. When the water level in first carbonator tank 120 fills to a predetermined high level, internal sensor and flotation device 280 sends an electrical signal to controller 130, which deactivates carbonator pump and motor 110 to ensure first carbonator tank 120 is not over-filled.

Controller 130 activates circulating pump and motor 140 after it deactivates carbonator pump and motor 110. A timing circuit in controller 130 ceases power to circulating pump and motor 140 after a set amount of time, which is adjustable within controller 130. Consequently, circulating pump and motor 140 operates only when the system demands fresh carbonate product, which prevents over-carbonation of the carbonated water and helps eliminate excessive foaming of the final mixed beverage upon dispensation.

The continuous flow of carbonated water helps the water carbonate more quickly than stagnant water and it helps preserve carbonation. Constant flow of carbonated water through cold water blocks 220 also helps to maintain a uniform low temperature, which promotes faster and more efficient absorption of carbon dioxide than ambient temperature water. As a result, the system maintains a reserve of low-pressure, refrigerated carbonated water from which it may draw at any time.

Syrup pump 260 draws syrup from syrup sources 210 and pumps the syrup through a plurality of tubing lines into brix capacitor 170 at a flow rate and pressure set by syrup regulators 270. The flow rate and pressure of the syrup is further controlled by flow control valves 172 displaced within brix capacitor 170. The syrup flows downstream from brix capacitor 170 into faucets 310 displaced along the lateral housing 302 of beverage dispensing tower 300.

To dispense a mixed beverage, a consumer moves handle lever 314 to the open position. Internal plunger 315 unseats from seat 316. Carbonated water and syrup are mixed as they flow at approximately equal pressures through conical flow guide 317 and into a target container.

Dispensing refrigerated carbonated water and syrup at fifty pounds per square inch, which is relatively low compared with industry-standard fountain machines, provides an advantage. State of the art technology employs a much higher-pressure carbonation system to maintain a desired carbonation range due to carbonated water stagnation and ambient temperature fluid storage. Typical fountain machines also do not employ refrigeration and continuous carbonated water circulation to maintain optimal carbonation and low-temperature fluids. Such high-pressure carbonated water dispenses at a high flow rate which creates a precipitous temperature drop, creates turbulent flow and results in excessive foaming. Mixing ambient temperature carbonated water and syrup at such pressures further exacerbates foaming. Excessive foaming causes the beverage to quickly "go flat" and lose consumer appeal. In contrast, carbonated water stored an optimal carbonation level, at low pressure and temperature dispenses at a relatively low flow rate which creates laminar flow, thereby significantly reducing foaming and creating a more desirable beverage.

For the purposes of promoting and understanding of the principles of the invention, reference has been made to the embodiments illustrated in the drawings, and specific language has been used to describe these embodiments. However, it will be apparent to those skilled in the art that various modifications and variations are possible while preserving the spirit and scope of the invention. Accordingly, the specific language herein intends no limitation of the scope of the invention, and the invention should be construed to encompass all embodiments that would normally occur to one of ordinary skill in the art.

What is claimed is:

1. A soda carbonation and dispensation system comprising:

a carbonation system configured to make carbonated water and to circulate said carbonated water through a first chiller system;

a syrup chilling and supply system operable to pump syrup through a second chiller system, wherein the second chiller system is separate from the first chiller system; and a dispensing tower operable to dispense fluid into a container, wherein said carbonation system is operable to deliver chilled carbonated water to said dispensing tower and said syrup chilling and supply system is operable to deliver chilled syrup to said dispensing tower, wherein said carbonation system comprises a first pump assembly operable to pump water into a first tank and a second tank and to draw water through a chiller upstream of a suction side of said first pump assembly.

2. The soda carbonation and dispensation system of claim 1, wherein said syrup chilling and supply system comprises at least one source of syrup and at least one syrup pump assembly operable to pump said syrup through said second chiller system and into said dispensing tower.

3. The soda carbonation and dispensation system of claim 2, wherein said syrup chilling and supply system further comprises at least one regulator operable to regulate a flow of said syrup discharged from said at least one syrup pump assembly.

4. The soda carbonation and dispensation system of claim 1, further comprising a brix capacitor operable to receive said carbonated water from the carbonation system and to regulate a flow of said carbonated water into said dispensing tower.

5. The soda carbonation and dispensation system of claim 4, wherein said syrup chilling and supply system comprises at least one source of syrup and at least one syrup pump assembly operable to pump said syrup through said second chiller system and into said dispensing tower, and wherein said brix capacitor is operable to receive said syrup from a discharge of said at least one syrup pump assembly and is operable to regulate a flow of said syrup into said dispensing tower.

6. The soda carbonation and dispensation system of claim 1, wherein said dispensing tower comprises a lateral housing to which a plurality of faucets are axially attached, and wherein each faucet of said plurality of faucets is connected to at least one source of said carbonated water via a first designated input and connected to at least one source of said syrup via a second designated input.

7. The soda carbonation and dispensation system of claim 1, wherein said carbonation system further comprises:

a second pump assembly operable to circulate carbonated water out of said first tank and said second tank, through said first chiller system, and back into said first tank and said second tank;

a level sensor in fluid communication with said first tank, said level sensor operable to determine a fluid level within said first tank; and a controller in electrical communication with said level sensor, said first pump assembly and said second pump assembly.

8. The soda carbonation and dispensation system of claim 7, wherein said level sensor is operable to determine when said fluid level within said first tank reaches a predetermined high level and a predetermined low level, and signal said controller accordingly.

9. The soda carbonation and dispensation system of claim 8, wherein said controller is operable to activate and deactivate said first pump assembly to maintain said fluid level inside said first tank between said predetermined high level and said predetermined low level.

10. A soda carbonation and dispensation system comprising:

a carbonation system configured to make carbonated water and to circulate said carbonated water through a first chiller system;

a syrup chilling and supply system operable to pump syrup through a second chiller system, wherein the second chiller system is separate from the first chiller system; and a dispensing tower operable to dispense fluid into a container, wherein said carbonation system is operable to deliver chilled carbonated water to said dispensing tower and said syrup chilling and supply system is operable to deliver chilled syrup to said dispensing tower, wherein said carbonation system comprises:

a first pump assembly operable to pump water into a first tank and a second tank, wherein said first tank is connected to a pressurized carbon dioxide source and said second tank is connected to a pressurized carbon dioxide source;

a second pump assembly operable to circulate carbonated water out of said first tank and said second tank, through said first chiller system, and back into said first tank and said second tank;

a level sensor in fluid communication with said first tank, said level sensor operable to determine a fluid level within said first tank; and a controller in electrical communication with said level sensor, said first pump assembly and said second pump assembly.

11. The soda carbonation and dispensation system of claim 10, wherein said level sensor is operable to determine when said fluid level within said first tank reaches a predetermined high level and a predetermined low level, and signal said controller accordingly.

12. The soda carbonation and dispensation system of claim 11, wherein said controller is operable to activate and deactivate said first pump assembly to maintain said fluid level inside said first tank between said predetermined high level and said predetermined low level.

13. The soda carbonation and dispensation system of claim 12, wherein said controller is operable to circulate said fluid by activating said second pump assembly when said first pump assembly is deactivated.

14. The soda carbonation and dispensation system of claim 10, wherein said first pump assembly and said second pump assembly comprise a 100 gallon per hour pump and a 1/3 horsepower motor.

15. A soda carbonation and dispensation system comprising:

a carbonation system configured to make carbonated water and to circulate said carbonated water through a first chiller system;

a syrup chilling and supply system operable to pump syrup through a second chiller system, wherein the second chiller system is separate from the first chiller system; and a dispensing tower operable to dispense fluid into a container, wherein said carbonation system is operable to deliver chilled carbonated water to said dispensing tower and said syrup chilling and supply system is operable to deliver chilled syrup to said dispensing tower, wherein said dispensing tower comprises a lateral housing to which a plurality of faucets are axially attached, wherein each faucet of said plurality of faucets is connected to at least one source of said carbonated water via a first designated input and connected to at least one source of said syrup via a second designated input, and wherein said syrup is delivered to each faucet of said plurality of faucets at a lower pressure than a pressure that said carbonated water is delivered to each faucet of said plurality of faucets.

16. The soda carbonation and dispensation system of claim 15, wherein each faucet of said plurality of faucets comprises a valve and a flow guide with an exterior and an interior.

17. The soda carbonation and dispensation system of claim 16, wherein said syrup and said carbonated water are mixed on said interior of said flow guide when said valve is opened.

18. The soda carbonation and dispensation system of claim 15, wherein said dispensing tower further comprises a tower chiller system operable to maintain said dispensing tower at a refrigerated temperature.

19. A soda carbonation and dispensation system comprising:

a carbonation system configured to make carbonated water and to circulate said carbonated water through a first chiller system;

a syrup chilling and supply system operable to pump syrup through a second chiller system, wherein the second chiller system is separate from the first chiller system; and a dispensing tower operable to dispense fluid into a container, wherein said carbonation system is operable to deliver chilled carbonated water to said dispensing tower and said syrup chilling and supply system is operable to deliver chilled syrup to said dispensing tower, wherein said first chiller system and said second chiller system comprise a plurality of interconnected cold blocks, wherein each interconnected cold block of said plurality of interconnected cold blocks comprises a refrigeration system and is operable to permit fluid flow through said refrigeration system.

20. A soda carbonation and dispensation system comprising:

a carbonation system configured to make carbonated water and to circulate said carbonated water through a first chiller system, wherein said carbonation system comprises:

a first pump assembly operable to pump water into a first tank and a second tank;

wherein said first tank is connected to a pressurized carbon dioxide source and said second tank is connected to a pressurized carbon dioxide source;

a second pump assembly operable to circulate carbonated water out of said first tank and said second tank, through said first chiller system and back into said first tank and said second tank;

a level sensor in fluid communication with said first tank, said level sensor operable to determine a fluid level within said first tank; and a controller in electrical communication with said level sensor, said first pump assembly and said second pump assembly;

a syrup chilling and supply system operable to pump syrup through a second chiller system; and a dispensing tower operable to dispense fluid into a container, wherein said carbonation system is operable to deliver chilled carbonated water to said dispensing tower and said syrup chilling and supply system is operable to deliver chilled syrup to said dispensing tower.

* * * * *